United States Patent [19]
Collie

[11] Patent Number: 5,671,711
[45] Date of Patent: Sep. 30, 1997

[54] LOW PRESSURE LPG VAPOR FUEL INJECTION

[75] Inventor: Curtis Bevan Collie, Dearborn Heights, Mich.

[73] Assignee: Ford Global Technologies, Inc., Dearborn, Mich.

[21] Appl. No.: 568,726

[22] Filed: Dec. 7, 1995

[51] Int. Cl.$^6$ ............................................. F02B 3/00
[52] U.S. Cl. ................................... 123/299; 123/527
[58] Field of Search ........................... 123/525–529, 123/27 GE, 575, 299

[56] References Cited

U.S. PATENT DOCUMENTS

| | | | |
|---|---|---|---|
| 4,335,697 | 6/1982 | McLean | 123/525 |
| 4,545,345 | 10/1985 | Pagdin et al. | |
| 4,617,904 | 10/1986 | Pagdin | |
| 4,829,966 | 5/1989 | D'Angelo et al. | |
| 5,070,850 | 12/1991 | Davis et al. | |
| 5,150,690 | 9/1992 | Carter et al. | 123/527 |
| 5,291,869 | 3/1994 | Bennett | |
| 5,367,999 | 11/1994 | King et al. | 123/527 |
| 5,373,824 | 12/1994 | Peters et al. | 123/527 |
| 5,398,657 | 3/1995 | Press et al. | 123/527 |
| 5,477,830 | 12/1995 | Beck et al. | 123/527 |
| 5,483,943 | 1/1996 | Peters | 123/527 |

FOREIGN PATENT DOCUMENTS

| | | | |
|---|---|---|---|
| 2422832 | 12/1979 | France | 123/527 |
| 1-182544 A | 7/1989 | Japan | |

Primary Examiner—Erick R. Solis
Attorney, Agent, or Firm—Donald A. Wilkinson

[57] ABSTRACT

An internal combustion engine (14) having a fuel supply system (10) for supplying propane vapor to the intake system of the engine. Multi-point fuel injectors (30) are located at each cylinder (12) for primary delivery of the propane vapor. In addition, an engine controller (36) activates supply orifices (34), when needed, to supplement the amount of propane vapor delivered by the fuel injectors (30).

6 Claims, 2 Drawing Sheets

LOW PRESSURE LPG VAPOR FUEL INJECTION

FIELD OF THE INVENTION

The present invention relates to vehicles having internal combustion engines employing liquid petroleum gas (LPG) as the fuel, and more particularly to a fuel system employing fuel injectors for supplying LPG to the engine cylinders.

BACKGROUND OF THE INVENTION

Conventional internal combustion engines employed in vehicles typically use either gasoline or diesel fuel to power the engine. Now alternatives to these two fuels are being employed to allow for alternative fuel resources and/or reduce exhaust emissions from vehicles. One of these alternative fuel sources is LPG (propane). A difference between the conventional fuels and propane is that it reverts to its gaseous state much more easily, i.e., its boiling temperature at atmospheric pressure is –40 degrees Fahrenheit. Thus, different challenges occur when employing this type of fuel than the conventional fuels. This difference particularly affects the fuel delivery system.

Some prior fuel delivery systems for propane feed it into the air intake system of the engine at a single point through vapor aspiration in a carburetor. However, with increased pressures to reduce exhaust emissions and improve fuel economy, carburetors have proven inadequate for the task. With a carburetor, the response time for changes in fuel flow is generally too slow and control flexibility as it relates to such things as deceleration shut off and speed governing are too limited.

Other attempts to develop a propane fuel delivery system employ a pump in the fuel tank. Generally, the pump is used to maintain the propane in the fuel delivery system at pressures high enough to remain in the liquid state until it flows through the fuel injectors. However, this can be hard to meter because, unlike the conventional fuels, the liquid propane vaporizes easily under high temperature conditions where the fuel is hot. Ensuring that the propane remains in the liquid state and metering this, then, further adds to the system complexity and can create potential reliability concerns of the fuel delivery system.

SUMMARY OF THE INVENTION

In its embodiments, the present invention contemplates a propane fuel supply system in a vehicle having an internal combustion engine, with the engine having a plurality of cylinders and an air intake system for supplying air to the cylinders. The propane fuel supply system comprises a fuel tank for receiving and storing propane liquid and vapor under vapor pressure, a plurality of first fuel injectors, one each adapted to operatively engage a different one of the cylinders, and a fuel supply orifice adapted to operatively engage the air intake system. The fuel supply system further comprises fuel transferring means for transferring propane vapor from the fuel tank to the plurality of first fuel injectors and the supply orifice, and control means for selectively activating the plurality of first fuel injectors and the supply orifice.

The present invention further contemplates a method of operating a vehicle internal combustion engine, having a plurality of cylinders, an air intake system, a plurality of first fuel injectors operatively engaging a respective one of the cylinders, and a secondary fuel injector operatively engaging the air intake system, with the engine employing propane vapor for fuel. The method of operating the engine comprises the steps of: providing a fuel tank containing propane liquid and vapor; removing a quantity of the propane vapor from the fuel tank and supplying it to the first fuel injectors and the secondary fuel injector; sensing the temperature and pressure of the propane vapor; determining the amount of air flowing through the air intake system; selectively actuating the plurality of first fuel injectors based on the temperature of the propane vapor and the amount of air; and selectively actuating the secondary fuel injector when the first fuel injectors reach their maximum capacity.

Accordingly, an object of the present invention is to provide a fuel delivery system for an engine in a vehicle that operates on propane vapor that can efficiently and accurately meter the fuel and provide sufficient quantities to operate under most climate conditions, while making it simple and reliable.

An advantage of the present invention is that potential problems with phase change due to high temperatures (hot fuel) that can occur in a fuel system that delivers the propane in a liquid state are avoided.

An additional advantage of the present invention is that there is quick response to changes in fuel flow and generally increased control flexibility for such operating conditions as deceleration fuel shutoff, speed governing, etc. over propane vapor aspiration.

A further advantage of the present invention is that secondary fuel supply orifices are provided to supplement multi-point fuel injectors for injecting propane vapor, thus expanding the engine's lower operating temperature range.

DETAILED DESCRIPTION OF THE PREFERRED EMBODIMENTS

Figure 1:
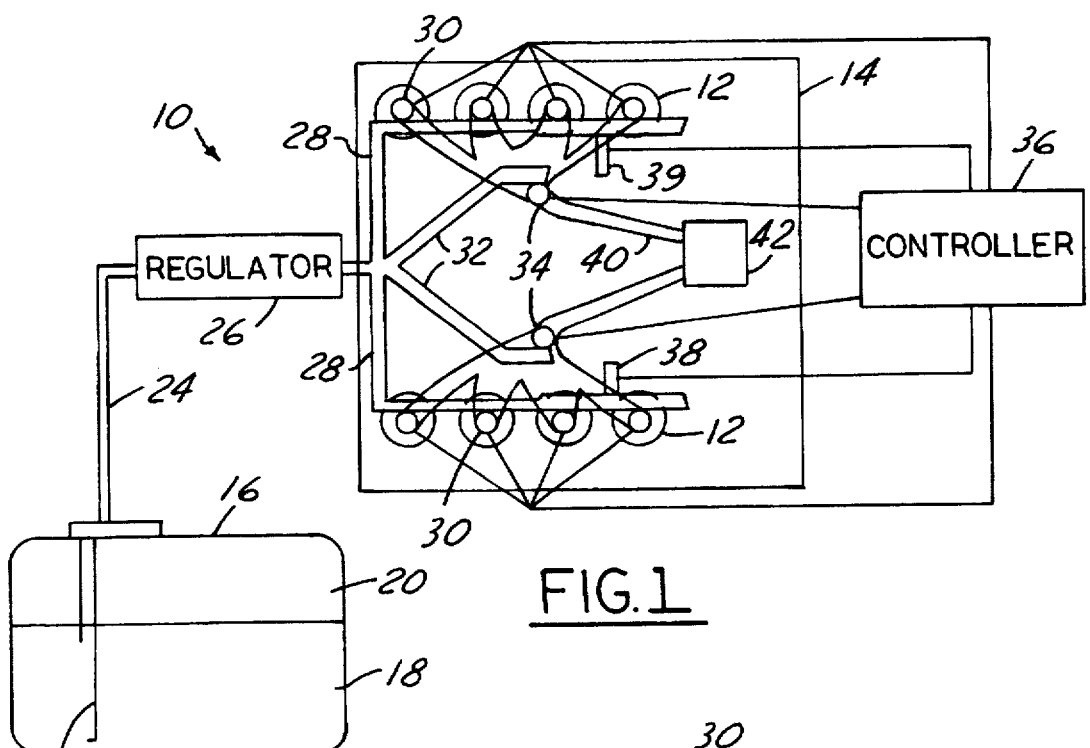
FIG. 1 is a schematic diagram of a first embodiment of the present invention.

FIG. 1 illustrates a first embodiment of the present invention, showing a fuel supply system 10 for supplying propane gas to eight cylinders 12 of a V-8 internal combustion engine 14. A fuel tank 16 holds the propane under vapor pressure. Generally, some of the propane will be in a liquid state 18 and some will be in a gaseous state 20 (vapor). The amount of each depends upon the vapor pressure in the tank 16, which is a function of the temperature of the propane. Propane has a boiling point of –40 degrees Fahrenheit at atmospheric pressure, so the higher the pressure and the lower the temperature, the less propane there will be that is vaporized. For this system the propane is injected as a vapor under low pressure (i.e., using the natural vapor pressure of the fuel rather than a pump), so there is only as much pressure in the system as the temperature will allow. This pressure will determine the amount of vaporized propane available for use. While this may limit the operating temperature range of the engine somewhat, the simplicity and reliability of the system is greatly enhanced, while still providing good fuel delivery control.

A liquid level sensor 22 extends into the tank 16 to determine the amount of liquid propane 18 that remains at any given time. This is used in a conventional manner to signal to the vehicle operator the amount of remaining fuel.

A gaseous fuel line 24 extends from the top of the tank 16 to a regulator 26. The regulator 26 places an upper limit on the pressure of the vapor passing through it into the rest of the fuel delivery system. A pair of primary fuel rails 28 extend from the regulator 26, one for each bank of four cylinders. Each of the primary fuel rails 28 connects to four fuel injectors 30, with each of the fuel injectors 30 supplying fuel for a corresponding one of the cylinders 12; this is a multi-point fuel injection type of arrangement.

The fuel injectors 30 are sized to deliver gaseous propane 20 in sufficient quantities to handle most normal operating conditions. One limitation is in very low temperature ranges where the fuel system may not deliver sufficient fuel flow to meet the engine fuel demand. However, for most climates, this will not be a concern. Since the propane is in a gaseous state, the amount that each injector 30 is capable of delivering depends upon the pressure at which the propane is delivered, which is directly affected by the temperature of the propane. For example, the injector sizes for an engine with multi-point fuel injection that operates with low pressure propane vapor will be about ten times larger, or more, as compared to a conventional gasoline engine.

A pair of secondary fuel rails 32 also connect to the regulator 26. They extend from the regulator 26 to a pair of secondary supply orifices 34. The secondary supply orifices 34 are each connected through the engine's intake air system 40 to a different one of the two banks of cylinders in the engine 14, upstream in the air intake system 40 of the multi-point fuel injectors 30, but downstream of the throttle body 42. The secondary supply orifices 34 are also preferably fuel injectors. The fuel injectors 30 and the supply orifices 34 are all electrically connected to an engine controller 36, which controls the timing of activation of the fuel injectors 30 and supply orifices 34. Further, a fuel rail temperature sensor 38, for measuring the temperature of the propane vapor, is mounted in one of the two banks of cylinders, and a pressure sensor 39 is mounted in the other bank. Both sensors are electrically connected to the controller 36.

In operation, the engine controller 36 receives a conventional input for air intake and then looks up this value in a conventional air/fuel request table to determine the required fuel input. The controller 36 also receives signals from the fuel rail temperature sensor 38, to determine the current propane temperature, and the pressure sensor 39, to determine the current propane pressure; the controller can then determine the density of the propane vapor 20. The controller 36 then calculates the fuel per millisecond (pulse-width) needed of the injectors 30 to deliver this amount of fuel. The controller 36 adjusts the pulse width of the fuel injectors 30 to supply the proper amount of propane vapor 20. Thus, as vapor pressure falls, the controller increases the pulse-width of the injectors until maximum duty cycle is reached.

If the controller already has the pulse-widths of the fuel injectors 30 at their maximum capacity and more fuel is called for, then the controller 36 activates the supply orifices 34 to inject the proper amount of supplementary fuel vapor into the air intake system 40. In this way, the fuel system 10 can operate at lower temperatures or with a larger displacement engine, for a given size of fuel injector at each cylinder, while still maintaining a fairly simple overall fuel supply system. Further, under almost all conditions, the fuel vapor at the injectors 30 and supply orifices 34 will be choked flow (sonic) so manifold pressure won't affect the flow rate.

Figure 2:
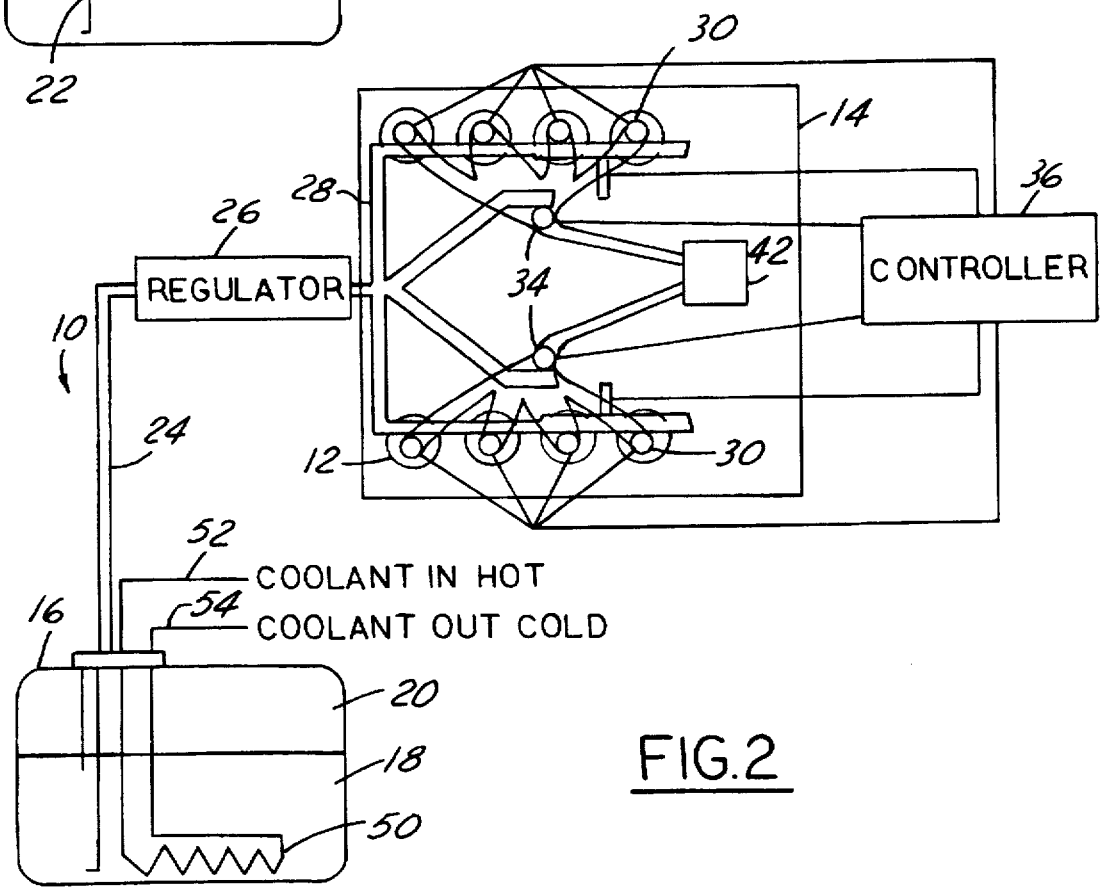
FIG. 2 is a schematic diagram of a second embodiment of the present invention.

A second embodiment is illustrated in FIG. 2, which is similar to the first embodiment, with the addition of a heat exchanger 50 in the fuel tank 16. Hot coolant, from a conventional engine cooling system not shown, flows into the tank 16 through a first line 52, through the heat exchanger 50 and out through a second line 54 back into the engine cooling system.

During engine operation, as the vapor 20 is withdrawn from the fuel tank 16, this action has a refrigerating effect on the propane in the tank 16. The primary purpose of the heat exchanger 50 is to maintain the temperature of the fuel at ambient temperature during engine operation rather than expand the operating temperature range for the fuel supply system 10. If the heat exchanger 50 is used to expand the operating temperature range for the fuel supply system by heating the fuel to above ambient temperature, then there is potential to create concerns with the control of the propane vapor condensing in the fuel rail 28. In this way, the fuel system still remains simple, inexpensive and reliable. If it is desirable to further expand the operating temperature range, then one may wish to further increase the size of the fuel injectors or add more injectors.

Figure 3:
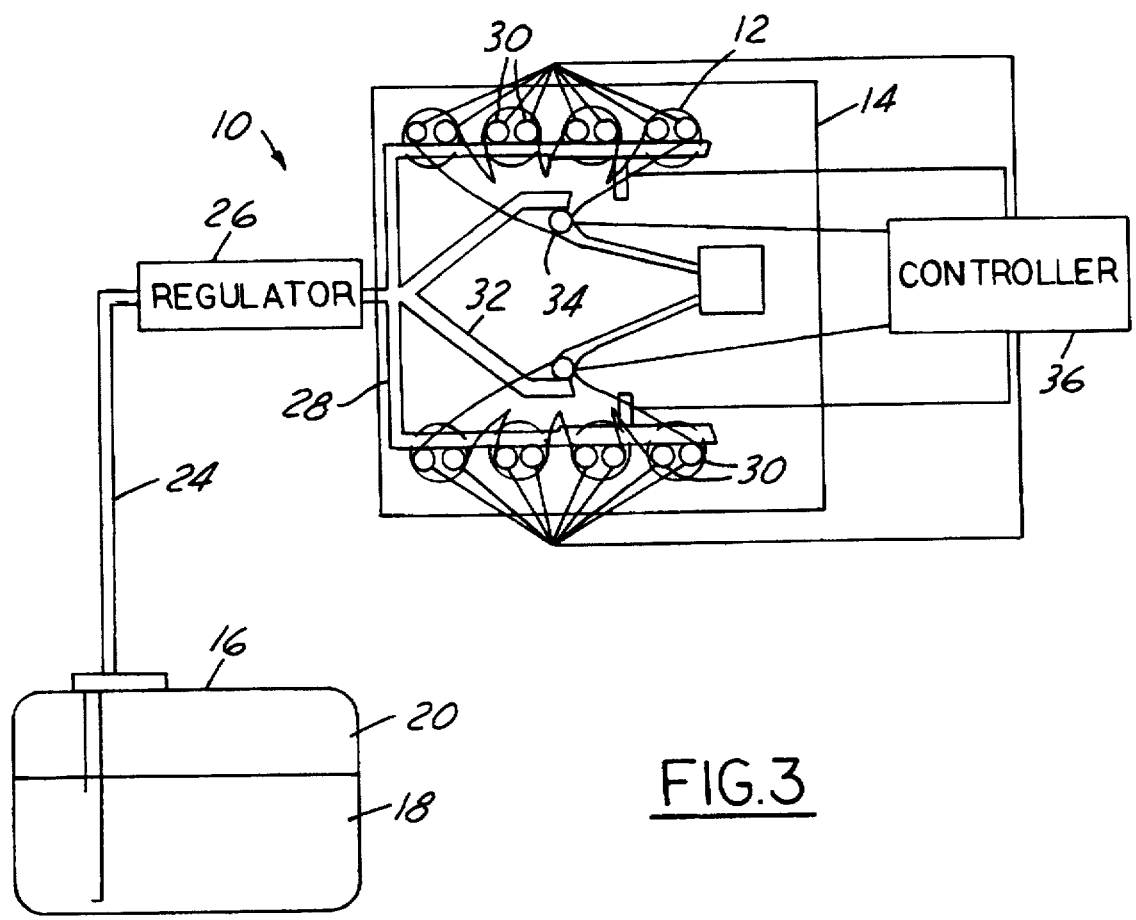
FIG. 3 is a schematic diagram of a third embodiment of the present invention.

A third embodiment is illustrated in FIG. 3, in which the fuel supply system is configured to allow for operation in a lower temperature range without further increasing the size of the individual fuel injectors. In this embodiment, two fuel injectors 30 operate at each cylinder 12. This arrangement allows for a higher rate of fuel delivery for a given vapor pressure and fuel injector size, thus allowing the fuel supply system 10 to operate in a lower temperature range. The trade-off, however, is in the cost of the additional fuel injectors employed in this embodiment.

While certain embodiments of the present invention have been described in detail, those familiar with the art to which this invention relates will recognize various alternative designs and embodiments for practicing the invention as defined by the following claims.

I claim:

1. An engine for use in a vehicle comprising:
   a plurality of cylinders;
   an air intake system for delivering air to each of the cylinders;
   a propane fuel tank adapted to contain propane fuel in both the liquid state and the vapor state;
   a plurality of first fuel injectors, one each operatively engaging a different one of the cylinders;
   a plurality of second fuel injectors, one each operatively engaging a different one of the cylinders;
   a secondary fuel injector operatively engaging the air intake system upstream of the first fuel injectors;
   transferring means for removing propane vapor from the fuel tank and transferring it to the plurality of first fuel injectors, the plurality of second fuel injectors and the secondary fuel injector; and
   control means for selectively activating the plurality of first fuel injectors, the plurality of second fuel injectors and the secondary fuel injector.

2. The engine of claim 1 wherein the cylinders are arranged in two banks with the air intake system connected to each bank, and the engine includes a second secondary fuel injector, with each of the secondary fuel injectors supplying propane to a respective one of the banks.

3. The engine of claim 1 further including heating means for heating the propane stored in the fuel tank.

4. The engine of claim 1 wherein the transferring means includes a pressure regulator, a fuel line mounted between the fuel tank and the pressure regulator and a plurality of fuel rails connected between the pressure regulator and the plurality of first fuel injectors and secondary fuel injector.

5. The engine of claim 1 further including a temperature sensor for sensing the temperature of the propane vapor in the transferring means and a pressure sensor for sensing the pressure of the propane vapor in the transferring means, with the temperature sensor and pressure sensor electrically connected to the control means.

6. An engine for use in a vehicle comprising:

a plurality of cylinders arranged in two banks;

an air intake system for delivering air to each of the cylinders;

a propane fuel tank adapted to contain propane fuel in both the liquid state and the vapor state;

a plurality of first fuel injectors, one each operatively engaging a different one of the cylinders;

a plurality of second fuel injectors, one each operatively engaging a different one of the cylinders;

a first and a second secondary fuel injector operatively engaging the air intake system upstream of the first fuel injectors, with the first secondary fuel injector operatively engaging one of the two banks of cylinders and the second secondary fuel injector operatively engaging the other of the two banks;

transferring means for removing propane vapor from the fuel tank and transferring it to the plurality of first fuel injectors, the plurality of second fuel injectors and the secondary fuel injectors, with the transferring means including a pressure regulator, a fuel line mounted between the fuel tank and the pressure regulator and a plurality of fuel rails connected between the pressure regulator and the plurality of first fuel injectors and the secondary fuel injectors;

control means for selectively activating the plurality of first fuel injectors, the plurality of second fuel injectors and the secondary fuel injectors; and a temperature sensor for sensing the temperature of the propane vapor in the transferring means and a pressure sensor for sensing the pressure of the propane vapor in the transferring means, with the temperature sensor and pressure sensor electrically connected to the control means.

* * * * *